Patented Nov. 9, 1937

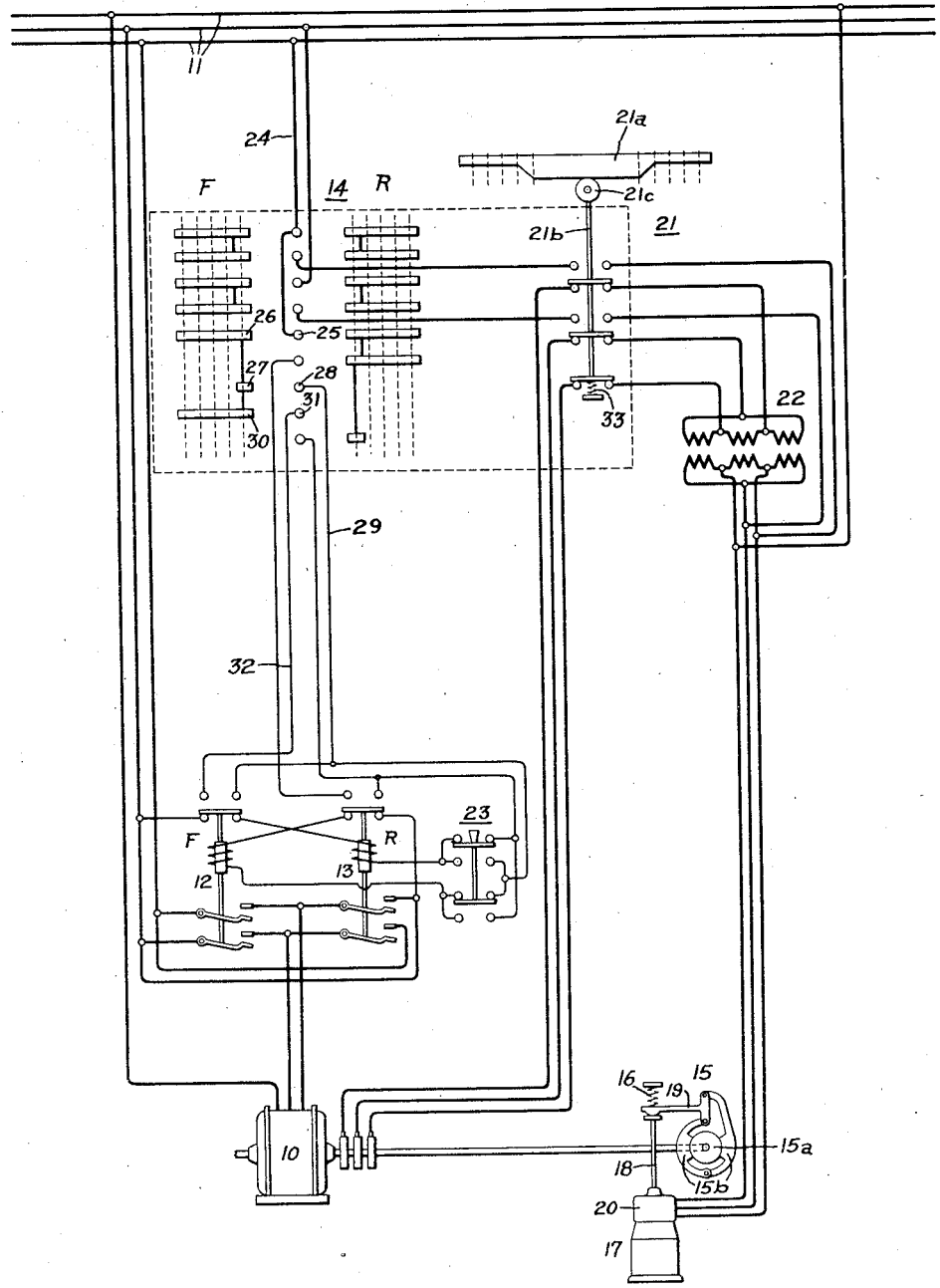

2,098,804

UNITED STATES PATENT OFFICE 2,098,804

CONTROL SYSTEM

Herbert Hootz, Berlin, Germany, assignor to General Electric Company, a corporation of New York Application July 1, 1936, Serial No. 88,435
In Germany July 9, 1935

3 Claims. (Cl. 172—179)

This invention relates to control systems, more particularly to systems for controlling the operation of electric motors, and it has for an object the provision of a simple, reliable and improved control system of this character.

Trolley motion gear and especially crane luffing gear driven by electric motors require a very sensitive control if troublesome load oscillation is to be avoided. A control provided for this purpose usually has a simple symmetrical multi-position motor switch which is arranged to provide reverse current braking in the first position. When actuating such a master switch through the zero position, in which position the drive can coast, the mechanical brake is held released by means of a special auxiliary switch, and an additional resistance is also inserted in the rotor circuit for the smooth braking. Furthermore, with such a control the master switch handle must be operated through a wide arc and also must be actuated through the deep notch at the zero position each time the motor is plugged.

Such an arrangement has the further disadvantage that when using the connection for luffing gear of cranes in case of an overhauling negative load immediately the motor is energized, a very sudden acceleration immediately occurs which causes the load to oscillate.

An object of the invention is to eliminate these disadvantages by providing for plugging without actuating the master switch through the zero position and by affording the same switching possibilities at each side of the master switch without adding to its complexity. This is accomplished by arranging the control to provide for proper actuation of the mechanical brake for smooth starting operation on the first point of the master switch in the running direction and by the provision of an auxiliary switching device to provide low torque operation of the driving motor upon returning the master switch from the last position to the second position and reverse current braking or plugging on the first position.

For a better and more complete understanding of the invention reference should now be had to the following specification and to the accompanying drawing, the single figure of which is a simple diagrammatical representation of an embodiment of the invention.

Referring now to the drawing, an electric motor 10 is connected to a load (not shown) such for example as the trolley motion gear or luffing gear of a crane. This motor is illustrated as an alternating current wound rotor induction motor and is supplied from a suitable source represented by the supply lines 11. A pair of reversing switches 12, 13 are provided for connecting the motor 10 to the supply source for operation in either the forward or reverse direction and a multi-position master switch 14 is provided for controlling the operation of the reversing contactors 12, 13. This master switch is illustrated conventionally as a reversing type drum switch. Switches of this type may be and usually are provided with fingers and cooperating segments for controlling sections of resistance in the motor circuit thereby to control its speed. Such master switches and the wiring therefor are often very complicated and accordingly all features not facilitating an understanding of the invention have been omitted in the interest of simplicity.

Motor 10 is provided with a mechanical brake 15 comprising a drum 15a connected to the motor shaft and a pair of brake shoes normally biased to braking position by means of a spring 16.

An electro-hydraulic operating mechanism 17 is provided for releasing the brake against the bias of the spring. This operator comprises a cylinder containing a fluid such as oil, a movable piston connected by means of connecting rod 18 to the brake shoe actuating arm 19, and an electric motor 20 which drives an impeller within the container to produce a pressure for moving the piston. A switching device 21 is provided for connecting the motor 20 of the electro-hydraulic operating mechanism to the source 11 or to the secondary winding of motor 10, depending upon the position of the master switch 14. This switch comprises a cam 21a connected with or forming a part of the master switch 14, and a movable contact member 21b carrying a cam rider 21c in engagement with the cam. When the master switch 14 is in the off position or the first position either forward or reverse, the switch 21 is in its lower position in which it connects the motor 20 to the slip rings of motor 10 through transformer 22 and when the master switch 14 is in any other position, either forward or reverse, the switch 21 is in its upper position in which it connects motor 20 to the source 11 through master switch 14.

An auxiliary switching device, illustrated as a manually operated push button type switch 23 is provided for establishing plugging connections for motor 10 in the first position on either side of master switch 14, without operating the master switch through the zero position.

With the foregoing understanding of the invention, the operation of the system will readily be understood from the following description:

The apparatus is illustrated in its normally deenergized condition with the master switch 14 in its central or off position. To start the motor 10 in the forward direction, the master switch 14 is operated to its first forward position in which an energizing circuit is established for the forward contactor 12. This circuit is readily traced from the lower supply line 11 through conductor 24, finger 25, segments 26 and 27, finger 28, conductor 29, intermediate contact of switching device 23, operating coil of the forward contactor 12, interlock of reverse contactor 13 and thence to the middle supply line 11. Forward contactor 12 closes in response to energization and connects the motor 10 to the supply source 11. Since the motor 20 of the electro-hydraulic brake operating mechanism is connected to the slip rings of the motor 10 in the first position of the master switch, the full frequency of the supply source 11 is applied to the motor 20 and causes it to rotate at full speed and develop the maximum pressure for releasing the brake shoes against the bias of the spring 16. Motor 10 starts to rotate in the forward direction, and as its speed increases the frequency of the voltage applied to the motor 20 decreases which causes a reduction in the force which holds the brake released. This allows the brake to set slightly until at some intermediate low speed of the motor a balance is established between the braking force of the brake and the speed of the motor 10, and the motor 10 continues to rotate at this intermediate speed.

Also, in the first position of the master switch 14, a holding circuit is established for the forward contactor that is traced from the power segment 26 through segments 27 and 30, finger 31, conductor 32, upper interlocks of forward contactor 12 and thence through intermediate contacts of push button 23 and operating coil of the forward contactor to the middle line of the supply source 11. Also in this position of the master switch, the cam rider 21c has ridden off the cam 21a. Spring 33 actuates the movable contact member 21b of switch 21 to its upper position in which it connects the motor 20 of the electro-hydraulic operating mechanism to the supply source 11 through the master switch 14. As a result, the brake shoes are held fully released when the master switch is in any position beyond the first position.

If it is now desired to stop the motor, the master switch is returned toward the zero position. By momentarily depressing the push button 23, in any position before the master switch reaches the first position, the energizing circuit for the forward contactor 12 is interrupted. The energization of the forward contactor will also be interrupted if the push button 23 is depressed when the master switch is in the first position, but it will be reestablished through the segment 27 of the master switch as soon as the push button is released. This allows the forward contactor to open its contacts and disconnect the motor 10 from the source so that the motor and its load can coast. If, however the operator holds the push button 23 depressed as the master switch 14 is returned to its first position, an energizing circuit is established for the reverse contactor 13. This circuit is traced from the power segment 26 through segment 27, finger 28, conductor 29, upper intermediate contacts of push button 23, operating coil of reverse contactor 13 and interlocks of forward contactor 12 to the middle line of the supply source 11. Contactor 13 closes in response to energization and connects the motor 10 to the supply source for rotation in a direction opposite to that in which the rotor is rotating. This produces a powerful braking torque and causes the speed of the motor 10 to be rapidly decreased. Simultaneously, the cam rider 21c is actuated downwardly by the cam 21a. This causes the movable contact member 21b of the switch 21 to open its upper contacts and disconnect the motor 20 of the electro-hydraulic operating mechanism from the source 11 and to connect it through the transformer 22 to the slip rings of the motor 10. The regulated mechanical braking action, previously described, does not take place immediately, because upon establishment of the plugging connection for the motor 10 the frequency of the secondary induced voltage is double the frequency of the line voltage, and consequently the motor 20 of the electro-hydraulic operating mechanism rotates at a very high speed and produces a high pressure which maintains the brake 15 fully released. However, if the operating conditions of the drive require that the motor 10 again be energized for rotation in the forward direction, the push button 23 may be released. This effects deenergization of the reverse contactor 13 and reestablishes energization for the forward contactor 12. The same conditions now obtain as those previously described in the operation of starting the motor from rest. The graduated mechanical braking operation is also reestablished.

It is obvious that if the master switch 14 is actuated for operation in the reverse direction, the same operations are effected as those previously described with the exception that the motor 10 rotates in the reverse direction. Thus, by actuating the small auxiliary switching device 23 and without actuating the master switch 14 through its zero position connections may be established for rotation either in the forward or reverse direction, coasting of the apparatus, mechanical braking action and reverse current braking apparatus plugging.

Although in accordance with the provisions of the patent statutes this invention is described as embodied in concrete form, it will be understood that the apparatus and connections shown are merely illustrative and that the invention is not limited thereto since alterations and modifications will readily suggest themselves to persons skilled in the art without departing from the true spirit of the invention or from the scope of the annexed claims.

What I claim as new and desire to secure by Letters Patent of the United States, is:

1. A motor control system comprising an alternating current induction motor, a mechanical brake for said motor biased to braking position, a multiposition master switch for controlling the operation of said motor, means for releasing said brake, means operable in the first running position of said master switch for connecting said brake releasing mechanism to the secondary winding of said motor thereby to produce a graduated braking action dependent upon the speed of said motor and responsive to operation to a running position beyond the first for disconnecting said brake releasing mechanism from said secondary winding and connecting it to said source to effect full release of said brake, and an auxiliary switching device operable upon return of said master switch to said first running position for establishing plugging braking connections for said motor.

2. A motor control system comprising a source of alternating voltage, an alternating current induction motor, a mechanical brake for said motor biased to the braking position, a multiposition master switch for controlling the operation of said motor, an electro-hydraulic operating mechanism for releasing said brake, said mechanism having an electric driving motor, means operable in the first running position of said master switch for connecting the motor of said operating mechanism to the slip rings of said induction motor thereby to produce a graduated braking action proportional to the speed of said induction motor and responsive to operation of said master switch to a position beyond said first running position for connecting the motor of said electro-hydraulic operating mechanism to said source to effect full release of said brake, and an auxiliary switching device operable upon return of said master switch for disconnecting said induction motor from said source and operable upon return of said master switch to said first position for establishing plugging braking connections for said induction motor.

3. A motor control system comprising in combination, a source of alternating voltage, an alternating current induction motor, a mechanical brake for said motor biased to the braking position, a multiposition reversing master switch for controlling the direction of operation of said motor, an electro-hydraulic operating mechanism for said brake having an alternating current driving motor, means operable in the first running position of either the forward or reverse side of said master switch for connecting the motor of said electro-hydraulic braking mechanism to the slip rings of said induction motor to provide a graduated braking force proportional to the speed of said induction motor and responsive to operation of said master switch to a running position beyond the first position for connecting the motor of said electro-hydraulic operating mechanism to said source for effecting complete release of the brake, and an auxiliary switching device operable during return of said master switch toward zero position from a running position in either direction for disconnecting said induction motor from said source and operable upon return of said master switch to the first running position for establishing plugging braking connections for said motor.

HERBERT HOOTZ.